United States Patent
Gotz et al.

[11] 3,833,270
[45] Sept. 3, 1974

[54] VEHICLE WHEEL FLUID BRAKE ANTI-LOCK SYSTEM

[75] Inventors: Werner Gotz, Friolzheim; Bernd Przybyla, Markgroningen, both of Germany

[73] Assignee: Robert Bosch GmbH, Gerlingen-Schillerhohe, Germany

[22] Filed: Jan. 30, 1973

[21] Appl. No.: 328,047

[30] Foreign Application Priority Data
Feb. 12, 1972 Germany............................ 2206807

[52] U.S. Cl.............................. 303/21 BE, 303/20
[51] Int. Cl............................................. B60t 8/12
[58] Field of Search .............. 188/181; 303/20, 21; 324/161–162; 340/53, 262, 263; 307/10 R; 317/5

[56] References Cited
UNITED STATES PATENTS

| | | | |
|---|---|---|---|
| 3,532,393 | 10/1970 | Riordan | 303/20 X |
| 3,547,501 | 12/1970 | Harned et al. | 303/20 X |
| 3,556,610 | 1/1971 | Leiber | 303/21 P |
| 3,578,819 | 5/1971 | Atkins | 303/21 BE |
| 3,637,264 | 1/1972 | Leiber et al. | 303/21 BE |
| 3,666,326 | 5/1972 | Marouby | 303/20 X |
| 3,674,320 | 7/1972 | Howard et al. | 303/20 X |
| 3,677,609 | 7/1972 | Davis et al. | 303/21 BE |
| 3,717,384 | 2/1973 | Harned | 303/21 BE |
| 3,744,851 | 7/1973 | Burckhardt et al. | 303/21 BE |

*Primary Examiner*—Trygve M. Blix
*Assistant Examiner*—Stephen G. Kunin
*Attorney, Agent, or Firm*—Flynn & Frishauf

[57] ABSTRACT

Brake fluid inlet and outlet valves to supply or drain pressurized brake fluid to or from a vehicle wheel are controlled by a plurality of acceleration sensors which receive acceleration signals derived by a differentiator from vehicle wheel speed signals. The vehicle wheel acceleration signal is additionally differentiated to obtain a rate of acceleration change signal, and two of the threshold switches are responsive to the further differentiated rate of acceleration change signal to provide for better matching of response of the system to road conditions, or changes in road conditions during braking.

40 Claims, 7 Drawing Figures

VEHICLE WHEEL FLUID BRAKE ANTI-LOCK SYSTEM

Cross reference to related applications: U.S. Ser. No. 288,791, filed Sept. 13, 1972; U.S. Ser. No. 325,569 filed: Jan. 22, 1973; U.S. Ser. No. 330,674 filed: Feb. 8, 1973.

The present invention relates to a vehicle wheel antilock, or anti-skid system for fluid operated brakes, particularly liquid brake fluid operated brakes, generally of the type disclosed and described in U.S. application Ser. No. 288,791, filed Sept. 13, 1972, and assigned to the assignee of the present application, to which reference is hereby made.

Vehicle wheel anti-skid systems have been proposed in which a d-c signal is obtained representative of vehicle wheel speed. This signal is then applied to a differentiator where it is differentiated to provide an output signal representative of wheel acceleration, or deceleration, depending upon the sign of the resulting signal. This rate-of-speed-change signal is utilized to control threshold switches which, in turn, when the positive or negative acceleration (acceleration or deceleration) of the wheel exceeds their respective threshold levels, control pressurized fluid inlet and outlet valves, respectively, to apply pressurized brake fluid to the brake cylinders of the wheel, to hold the pressurized brake fluid constant, or to drain pressurized brake fluid therefrom, in dependence on sensed wheel speed changes. In one such system, four threshold switches are provided. The threshold level of the first is set to be responsive to a predetermined value of wheel deceleration; the second switch responds to approximately wheel acceleration of zero; the third responds at a positive value of wheel acceleration and the fourth responds at a different value of positive wheel acceleration. A storage device, typically a flip-flop is provided, the switching state of which is controlled by two of the threshold switches in order to control the drain valve of the pressurized brake fluid so that, if a certain wheel deceleration is sensed, continued application of brake fluid pressure is inhibited and, when the wheel no longer decelerates, braking pressure can be held even, or increase, in dependence on sensed rates of change of wheel speed. A logic circuit is additionally preferably provided to prevent simultaneous application of pressurized brake fluid to the wheel cylinder while the drain valve is open.

For most effective operation, such a wheel anti-lock or anti-skid system should meet these requirements:

1. Rapid response to change in wheel rate of change of speed and
2. the theshold level controlling the switching of the valves, and hence their open or closed position, should be matched to existing road conditions.

The second requirement causes difficulty since some way must be provided to obtain a signal responsive to road conditions, that is, whether the frictional contact between wheel and road is high, or low. Thus, the slipperiness of the road surface should be evaluated. It has been proposed to provide a monostable multivibrator in order to measure the time necessary for re-acceleration of a previously decelerated wheel. Such a monostable multivibrator thus permits to distinguish between two different values of the derivative, with respect to time, of wheel acceleration, thereby providing a signal which is representative of road conditions, as measured by the acceleration state of the wheel rolling, or sliding thereover. The time required for re-acceleration of a previously retarded wheel is solely determined by the frictional coefficient between road and wheel.

The threshold value of threshold switches is normally so set that a distinction can be made in the response of the system between dry and wet roads. It is desirable, however, to distinguish between different states of slipperiness; for example, to distinguish not only between dry and wet roads but also between extreme conditions of slipperiness, such as an iced road surface.

It is an object of the present invention to provide a vehicle wheel anti-lock system which is capable of adapting itself to more than two states of road surface conditions, with respect to frictional coefficient between road and wheel.

The invention thus relates to a vehicle wheel braking system in which a vehicle wheel acceleration or deceleration signal is obtained, which is analyzed with respect to threshold levels in order to control a vehicle wheel pressurized brake fluid system.

subject matter of the present invention: Briefly, the differentiated signal of wheel speed, that is, the wheel acceleration (deceleration) signal is again differentiated to provide a further derivative signal, and some of the threshold switches of the system are connected to be responsive to the further derivative signal. The threshold level of these threshold switches is set to be in positive direction, so that these threshold switches respond during re-acceleration of the vehicle wheel. By setting the threshold levels of the various threshold switches at different values, either one, or none of these threshold switches will respond, thus providing an indication of more than one road condition. If two such threshold switches are provided, a distinction can be made between dry road (response of none of the switches), wet road (response of a low level set threshold switch only) and iced or highly slippery conditions, that is, upon response of the highest level threshold switch.

The invention will be described by way of example with reference to the accompanying drawings, wherein.

Figure 7:
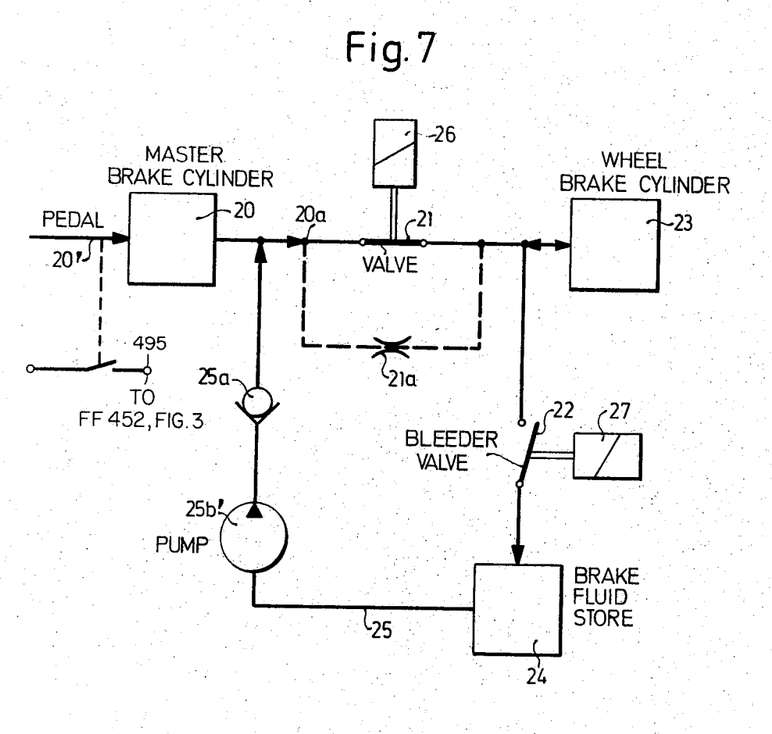
FIG. 7 is a generalized block diagram illustrating the vehicle wheel braking arrangement which is controlled by the system of the present invention.

Referring first to FIG. 7: A brake operator, typically a pedal 20' controls a master brake cylinder 20. Pressurized brake fluid is supplied from a brake fluid store or sump 24 over a line 25, pumped by a pump 25b' over a check valve 25a, and then supplied to a junction 20a, under control of the master brake cylinder. Junction 20a is connected to an electro magnetically operated fluid valve 21, having a control winding 26. Valve 21 is normally closed, so that pressurized brake fluid can pass from junction 20a through the valve into a wheel brake cylinder 23, when the master brake cylinder 20 is operated. A bypass to valve 21 may be provided, over a constriction or choke 21a. Pressurized brake fluid can be drained from the wheel brake cylinder 23 by a valve 22, which is electromagnetically operated by a winding 27. Bleeder valve 22 is normally open, as shown in FIG. 7. Upon operation of the master brake cylinder, pressurized brake fluid is supplied to wheel brake cylinder 23. The anti-skid device of the present invention selectively controls opening of valve 21, and closing of valve 22 to bleed pressurized brake fluid from the wheel brake cylinder back into the sump or store 24.

Figure 1:
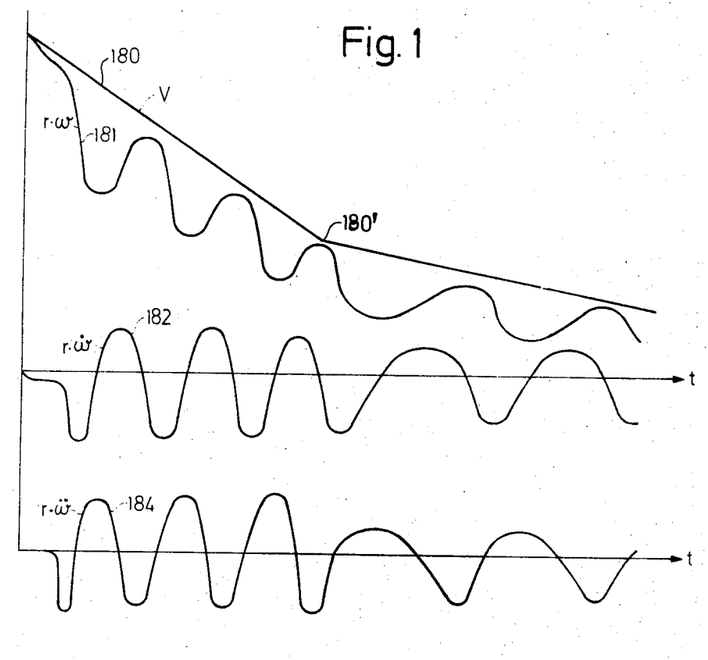
FIG. 1 is a series of graphs illustrating the operation of the system.

Referring now to FIG. 1: Assuming a vehicle to be operated on a road surface which has a changing coefficient of friction during the brake path. Graph 180 shows the speed of the vehicle, with respect to time. Let it be assumed that first the coefficient of friction is high and then decreases, for example due to subsequent water or icing of the road. upon braking, the speed first decreases rapidly and then more gradually. The change in road surface condition is indicated at break point 180'.

Curve 181 illustrates the wheel circumferential speed $r\omega$, with respect to time, in which $r$ is the radius of the vehicle wheel and $\omega$ is the angular speed. Let it be assumed that the driver of the vehicle uses maximum braking, so that the vehicle anti-lock system periodically raises and drops the braking pressure.

curves 182 and 183 illustrate, with respect to time, the first and second derivative of circumferential wheel speed. Comparing curves 182 and 184, it will be immediately apparent that on the road section which is smooth, more time is necessary in order to re-accelerate the wheel from a high deceleration value to a positive acceleration. This is due to the time necessary for brake fluid pressure to drop in the brake wheel cylinder. A finite period of time is necessary for brake pressure to drop, and thus the braking torque decreases not instantaneously but gradually.

The slope of the acceleration curve 182 thus becomes a measure for the frictional coefficient between road and wheel. The value of this slope is determined by the derivative thereof, that is, by the next differentiation of the wheel acceleration signal, as is apparent from curve 184. A smooth road results only in small maximum values of curve 184; dry road conditions result in higher values.

When braking pressure is reduced for a long enough period of time, even smooth roads will permit large positive wheel accelerations $r\dot{\omega}$. The maximum value of acceleration $r\dot{\omega}$ is only slightly less on a smooth road than on a dry road (see curve 182). The rate of change of acceleration is, however, entirely different and thus the maximum values of the second derivative of circumferential wheel speed, $r\ddot{\omega}$ on a smooth road is substantially less, and thus can be used as a good measure for road conditions or, as far as the vehicle is concerned, for frictional coefficient between wheel and road.

The system will be explained using standard logic notation; in the diagrams, inverting inputs or outputs are indicated by a dot; ONE-signals and ZERO-signals are provided when a respective stage has either positive, or zero (chassis) potential at the line carrying the signal.

If the magnetic winding 26 of inlet valve 21 (FIG. 1) is excited, the inlet valve is closed. The outlet valve 22, however, remains in its rest position, that is open, so that the pressure $p$ in the brake line leading to the wheel brake cylinder 23 remains steady or even. Upon subsequent energization of the bleeder value winding 27, brake pressure $p$ drops rapidly. It does not, however, drop instantaneously upon energization of the winding 27. The system of FIG. 2, basically, controls the energization of the two magnet windings 26, 27. A vehicle wheel speed transducer providing a vehicle wheel speed signal is connected to input terminal 393. Such transducers are well known. They provide an output d-c signal, which may be filtered or not, having a magnitude proportional to circumferential speed $r\omega$ of the element from which rotation is being transduced, typically the vehicle wheel.

A first differentiator 330 is connected to input terminal 393. Two low pass filters of 18 Hz and 40 Hz, respectively, are connected in parallel to the output of differentiator 330, as seen at 332, 333, FIG. 2. The upper limit frequency of 18 Hz of filter 332 provides an output signal which is filtered more than that derived from the second low pass filter 333, which has a higher limiting frequency. If the output signal of differentiator 330 changes rapidly, that is, jumps to another value, then the output derived from the first low pass filter 332 is time delayed for a longer period than the output signal of the second low pass filter 333.

Figure 2:
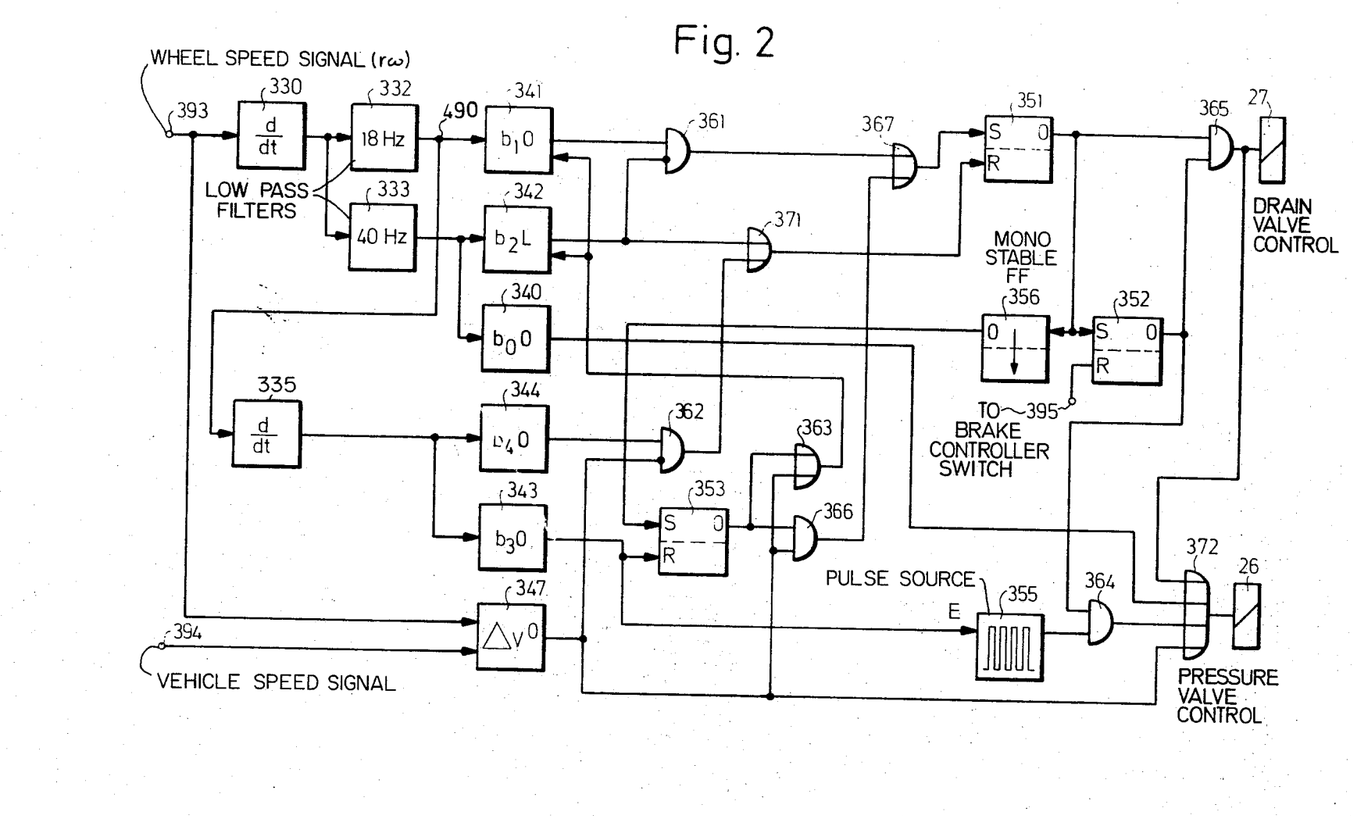
FIG. 2 is a general block circuit diagram of the system.

The output of first low pass filter 332 is connected to a first threshold switch 341 having a threshold level $b1$. In accordance with the invention, a second differentiator 335 is provided. Differentiator 335 derives its input from low pass filter 332, and has its output connected to third and fourth threshold switches 343, 344. The second low pass filter 333 has its output connected to a second threshold switch 342 and a fifth threshold switch 340. A speed comparison circuit 347 compares circumferential wheel speed by having a signal applied thereto from input terminal 393, with actual vehicle speed by having a signal applied to a terminal 394, to which a d-c potential is applied having a magnitude representative of vehicle speed $v$. The speed comparison circuit 347, essentially, includes a threshold switch which provides a 1-signal at its output if the difference between vehicle speed $v$ and circumferential wheel speed exceeds its threshold level. The signal provided by the threshold switches when the switch has not responded is indicated in FIG. 2. The threshold level of the various threshold switches is indicated by $b_0$–$b_4$, and the threshold level of the speed comparison circuit by $\Delta v$.

The outputs of the first and second threshold switches 341, 342 are connected to the inputs of an AND-gate 361, threshold switch 342 being connected over an inverting input. The output of AND-gate 361 is connected to one input of an OR-gate 367 which, in turn, is connected to the SET input S of a first storage device 351. The fourth threshold switch 344 and the speed comparison circuit 347 are connected to the inputs of an AND-gate 362, speed comparator 347 being connected over an inverting input. The output of AND-gate 362 is connected to one input of an OR-gate 371, which derives another input from the second threshold switch 342. The output of OR-gate 371 is connected to the RESET terminal R of the first storage device 351.

The output of the first storage device 351 is connected to one input of an AND-gate 365 and to the SET terminal S of a second storage device 352, as well as to the input of a delay circuit 356. The reset terminal R of the second storage device 352 is connected to a terminal 395 which connects to the brake light switch, operated by the brake pedal 20' (FIG. 7). The output of the second storage device 352 is connected to the second input of AND-gate 365. The output of AND-gate 365 controls the magnet winding 27 of the bleeder or outlet valve 22 of the brake system (FIG. 7).

The output of delay circuit 356 is connected to the set input S of a third storage device 353. The third threshold switch 343 is connected to the reset terminal R of the third storage device 353. The output of the third storage device 353 and the output from speed comparator 347 are connected to the inputs of an AND-gate 366, the output of which is connected to another terminal of OR-gate 367. The output of third storage device 353 further is connected to one input of OR-gate 363, which is likewise connected to the output of the speed comparator 347. Its output is connected to threshold control terminals of threshold switches 341, 342. These terminals control the threshold level of the threshold switches 341, 342.

An astable multivibrator 355 is provided which has a blocking input E. The blocking input E is connected to the output of the third threshold switch 343. The output of astable multivibrator 355 as well as the output of the second storage device 352 are connected to an AND-gate 364. The pressure control valve winding 26 is energized through an OR-gate 372 which has the following four inputs applied: output of AND-gate 365; output of fifth threshold switch 340; output of AND-gate 364; output of speed comparator 347.

The operation of the circuit will be described in connection with FIG. 5 which illustrates, with respect to time $t$: curves 582 and 584 which indicate the first and second derivative of circumferential wheel speed $r\omega$ that is, $r\dot{\omega}$ and $r\ddot{\omega}$. Three control cycles are shown, in which it is assumed that the road surface becomes increasingly slippery as the vehicle is being braked. The general curves are, otherwise, similar to curves 182, 184, of FIG. 1. The pulse diagrams 540–572 illustrate the output voltages of the stages described in connection with FIG. 3, incremented by 200. Thus, the diagrams 540–572 illustrate the output voltages of: fifth threshold switch 340, first threshold switch 341, second threshold switch 342, third threshold switch 343, fourth threshold switch 344, first storage device 351, third storage device 353, AND-gate 365 and OR-gate 372. Curve 583 illustrates the brake pressure p of brake fluid in a wheel brake cylinder 23 (FIG. 7), the various sections of the curve 583 corresponding to different braking pressures due to the operation of the system.

The operation will be described by making an assumption which is not entirely correct, in order to simplify the explanation. For simplicity, let it be assumed that the time delays of the two pass filters 332, 334 are equal. If the limiting frequencies, as shown in FIG. 2, are different, some phase differences will result in the output signals of the two filters. These phase differences do not, essentially, change the brake pressure $p$, with respect to time, in view of the mechanical inertia and delays in the valves and valve system. Thus, as far as ultimate braking pressure $p$ is concerned — which is, what the system is to control — the assumption is justified. As a measure of acceleration, gravity $g$ of about $10m/s^2$ will be used as a basis, both for wheel acceleration (positively) and deceleration ("negative acceleration").

In an actual operating example, threshold level $b_0$ of the fifth threshold switch 340 is set to be $-2g$; threshold level $b_1$ of the first threshold switch 341 is set at $-3.5g$; threshold $b_2$ of the second threshold switch 342 is set to be $-1g$. After the third threshold switch 353 has responded, the threshold levels are changed, so that the first threshold switch 341 will have a threshold response $b'_1$ of $-2g$; the second threshold switch 342 will have a threshold response of $b'_2$ of $+4g$.

The input signals to the third and fourth threshold switches 343, 344 indicate change in wheel acceleration. In the example, threshold level $b_3$ is 400 g/sec.; threshold level $b_4$ is 200 g/sec. The threshold level of 400 g/sec. is reached only when the coefficient of friction $\mu$ between wheel and road is greater than 0.6. The second threshold level of 200g/sec. is reached when the coefficient of friction $\mu$ is between 0.3 and 0.6. If the road surface is even smoother, then none of the threshold switches 343 and 344 will respond, and the first storage device 351 is reset only under control of the second threshold switch 342.

Operation (with reference to FIGS. 2 and 5): If the operator depresses the brake pedal 20' (FIG. 7), braking pressure will rise rapidly — curve portion 583A, since the braking pedal is being depressed strongly. The wheel retardation or deceleration will increase until the threshold level $b_0$ of $-2g$ of the fifth threshold switch 340 is exceeded. The fifth threshold switch 340 then provides a 1-signal which is applied over the OR-gate 372 to the magnet winding 26 to energize winding 26 and close inlet valve 21 to interrupt application of further braking pressure. Since the drain valve 22 is closed, the braking pressure $p$ will remain constant, see curve section B. The wheel continues to be delayed, however, and the threshold level $b_1$ of first threshold switch 341, that is, $-3.5g$, will be exceeded and at that point the threshold switch 341 will provide a 1-signal. Since, simultaneously, the threshold level $b_2$ of $-1g$ also has been exceeded, the second threshold switch 342 provides a 0-signal, so that, upon inversion in AND-gate 361, output will be applied to OR-gate 367, setting the first storage device 351, which will provide at its output a 1-signal, enabling AND-gate 365 to energize drain winding 27 and open bleeder valve 22. Braking pressure will drop rapidly — see curve section C. The AND-gate 365 is enabled, at its second input, since the output of storage device 351 also sets the second storage device 352 which provides the necessary enabling signal to AND-gate 365.

The second storage device 352 can be reset only upon release of the brake pedal, that is, when brake controller switch 395 is disabled, so that also the brake lights are extinguished. The second storage device 352 thus is a safety and interlock circuit and, during operation of the system, that is when the brake is depressed, will always provide an enabling signal at its output and its operation need not be further considered in the operation of the anti-skid system.

The output from the first storage device 351 not only provides a set signal to the second storage device 352 but likewise sets the delay device 356. The delay device 356, in its simplest form, is a monostable multivibrator (FF) which has a time constant of about 2 m sec. Thus, approximately 2 m sec. after storage device 351 was set, an output signal is derived from the time delay circuit 356 to set the third storage device 353 so that it will likewise provide a 1-signal. This provides a signal to enable OR-gate 363, the output of which changes the threshold levels of threshold switches 341, 342 to $-2g$ and $+4g$, respectively, as above described.

The rapid and steep pressure drop (curve 583, section C) decreases the braking effort, so that the wheel deceleration will increase but slightly. Curve 582 thus passes through its minimum value, and wheel deceleration becomes less and less until it becomes zero and a positive wheel acceleration $r\dot{\omega}$ will result. Curve 584 illustrates the rate of change of wheel deceleration, and at the maximum negative value of curve 582, curve 584 passes through zero. As soon as the wheel retardation changes into positive direction, curve 584 goes through a positive half wave.

Let it be assumed that, as braking was started, the road surface was dry and had a coefficient of friction which is greater than 0.6. During the first, positive half wave of curve 584, both threshold switches 343 and 344 will therefore respond. The fourth threshold switch 344 will provide a 1-signal as soon as the change in wheel acceleration $r\dot{\omega}$ exceeds the threshold value $b_4$ of 200 g/s. Assuming, simultaneously, that the speed comparator 347 has not yet responded and therefore provides a 0-signal, the 1-signal at the output of the fourth threshold switch 344 resets the first storage circuit 351 over OR-gate 371.

The second magnet winding 27 is therefore de-energized and the outlet or drainage valve 22 (FIG. 7) will close again. Since valve 21 has remained open (winding 26 energized over fifth threshold switch 340), braking pressure $p$ will remain constant at, however, a lower value than before — see curve 583, section D. The third threshold switch 343 will respond shortly after the fourth threshold switch 344. Initially, the only effect will be resetting of the third storage device 353, and blocking of the astable multivibrator 355. As yet, there is no effect on braking pressure itself. The astable multivibrator 355 provides output pulses at a frequency of about 100 Hz (although this frequency may vary widely and depend on the construction of the vehicle), that is, pulses which cyclically change in value between zero and one. A 1-signal at the blocking input E blocks output from the circuit 355 so that it provides a continuous 0-signal at its output. The period of time during which the braking pressure $p$ is maintained at an even or uniform value is terminated when the valve 21, energized by winding 26, is again closed. This is effected by de-energizing magnet winding 26, and occurs when the output signal of the fifth threshold switch 340 resets to zero. Braking pressure can again rise steeply, as long as the third threshold switch 343 provides a 1-signal — see curve section E. When curve 584 reaches the threshold value $b_3$ of 400 g/s, wheel acceleration $r\dot{\omega}$ will increase only slightly. In order to prevent wide control swings within the braking pressure $p$, rapid rise in braking pressure is inhibited, however, and after resetting of the third threshold switch 343, the astable FF 355 is disabled to provide output pulses to OR-gate 372, to enable the winding 26 periodically. Braking pressure rises slowly, in pulses, as seen by curve section 583 F.

The slow rise in pressure causes wheel acceleration to drop and again pass through zero, and effect deceleration. At the theshold level $b_0$, the fifth threshold switch 340 will again respond and energized magnet winding 26 of the pressure valve 21, to open the pressure valve, over OR-gate 372. The pressure will remain constant but only for a very short period — see curve section G — since the first threshold switch 341 will quickly respond. This causes energization of the drain valve control winding 27, opening of the drain valve and hence a rapid and extensive pressure drop, see curve section H. The circuit to drain pressure fluid will be as described in connection with the start of the braking cycle.

When the fourth theshold switch 344 responds, the drain valve winding 27 is again de-energized, the valve will close, and a constant brake pressure period will follow — curve section I, until curve 582 again passes the threshold level $b_0$ to permit pressure to rise. Up to curve section I, the second control cycle was similar to the first.

In accordance with the prior assumption, the coefficient $\mu$ has dropped, however, and is now only between 0.3 and 0.6. Thus, the third threshold switch 343 will not respond anymore, and the constant pressure phase as represented by curve I is not followed by a steep pressure rise as illustrated in curve section E. Rather, OR-gate 372 only receives the pulsed signal from astable multivibrator 355 and is not entirely blocked. The pressure will thus rise slowly and increase during the entire positive half wave of curve 582, in pulsed steps, and the pressure rise is terminated only when the threshold level $b_0$ of the fifth threshold switch 340 is passed, see curve section J. The third storage device 353 has been set after the time delay of monostable FF 356, which will usually occur after the first storage device 51 has been reset. Third storage device 353 remains set through the entire braking sequence if the road is slippery, since the third threshold switch 343 will not respond on a slippery road. This, then, sets the threshold levels of first and second threshold switches 341, 342 to their more sensitive levels of $-2g$ and $+4g$, respectively. The threshold level $b'_1$ of first threshold switch 341 will then be the same as that of the fifth threshold level $b_0$. The inlet valves and outlet valves will thus be operated essentially simultaneously, but not quite. The difference in maximum cut-off of the filters 332 and 333 will now come into play. The pressure control valve 26 will close first before the drain valve will open since the signal to the fifth threshold switch 340, through the filter 333 with a maximum cut-off of 40 Hz is delayed for a lesser period than the signal applied from the first filter 332 of maximum cut-off of 18 Hz, being applied to the first threshold switch 341.

The example assumes that the road has become very slippery, so that the coefficient of friction is below 0.3. The fourth threshold switch 344 will thus no longer respond. This causes the braking pressure $p$ to drop for a longer period of time, causing a substantially greater drop, that is, until the second threshold switch 342 responds — see curve section K. The threshold level $b_2$ of the second threshold switch 342 has already been set by the third storage device 353 to $+4g$ during the second operating cycle, in order to provide for an additional extension of the period during which pressure fluid bleeds through drainage valve 22, that is, during the time when winding 27 is energized. Braking pressure must be reduced substantially in order to provide for wheel acceleration on a slippery or smooth road surface.

Upon response of the second threshold switch 342, OR-gate 371 receives a 1-signal to provide a reset signal to the first storage device 351. Store 351 thus is reset and the drain valve 27 becomes de-energized. Up until that point, AND-gate 365 provided a 1-signal to OR-gate 372. Drain valve 22 is thus closed upon opening of the pressure valve 21.

Pressure valve 21 is not open continuously, since rapid pressure rise in the brake system would not be suitable for a smooth road surface. Rather, the pressure rise is gradual under control of the pulse source 355, which is not disabled.

The operation of the embodiment in accordance with FIG. 2 has been described sofar without consideration of the effect of the speed comparison circuit 347. The speed comparator 347 is used when both vehicle and wheel circumferential speeds are comparatively small and when the acceleration and deceleration values of the wheel, sensed by the various threshold switches, no longer are passed in order to effect pressure regulation. At comparatively high vehicle speeds, speed comparator circuit 347 is used to prevent braking of a vehicle wheel to locked position with a delay which is less than the threshold value of threshold switch 340, that is, less than the value $b_0$, set for $-2g$.

The first storage device 351 can be set by the speed comparator 347 over OR-gate 367 by AND-gate 366, if the third store 353 already has been set. The speed comparator also changes the threshold levels of the first and second threshold switches 341, 342 over OR-gate 363, thus having the same effect as setting of the third store 353.

The speed comparator circuit 347 also energizes winding 26 of the pressure valve immediately, over OR-gate 372, to close the pressure fluid line. AND-gate 362 is disabled, so that after speed comparator 347 has responded, only the second threshold switch 342 rather than the fourth threshold switch 344 will reset the first store 351.

The AND-gate 361 ensures sequential operation, so that the output signal of the first threshold switch 341 cannot appear in advance of a signal from the second threshold switch 342. The timing or sequential occurrence of these signals is governed by the different cut-off levels of the input filters 332, 333, respectively, causing different time delays of the inputs. The first store 351 thus can be set by the first threshold switch 341 only if the second threshold switch 342 is responding or already has responded.

Figure 3:
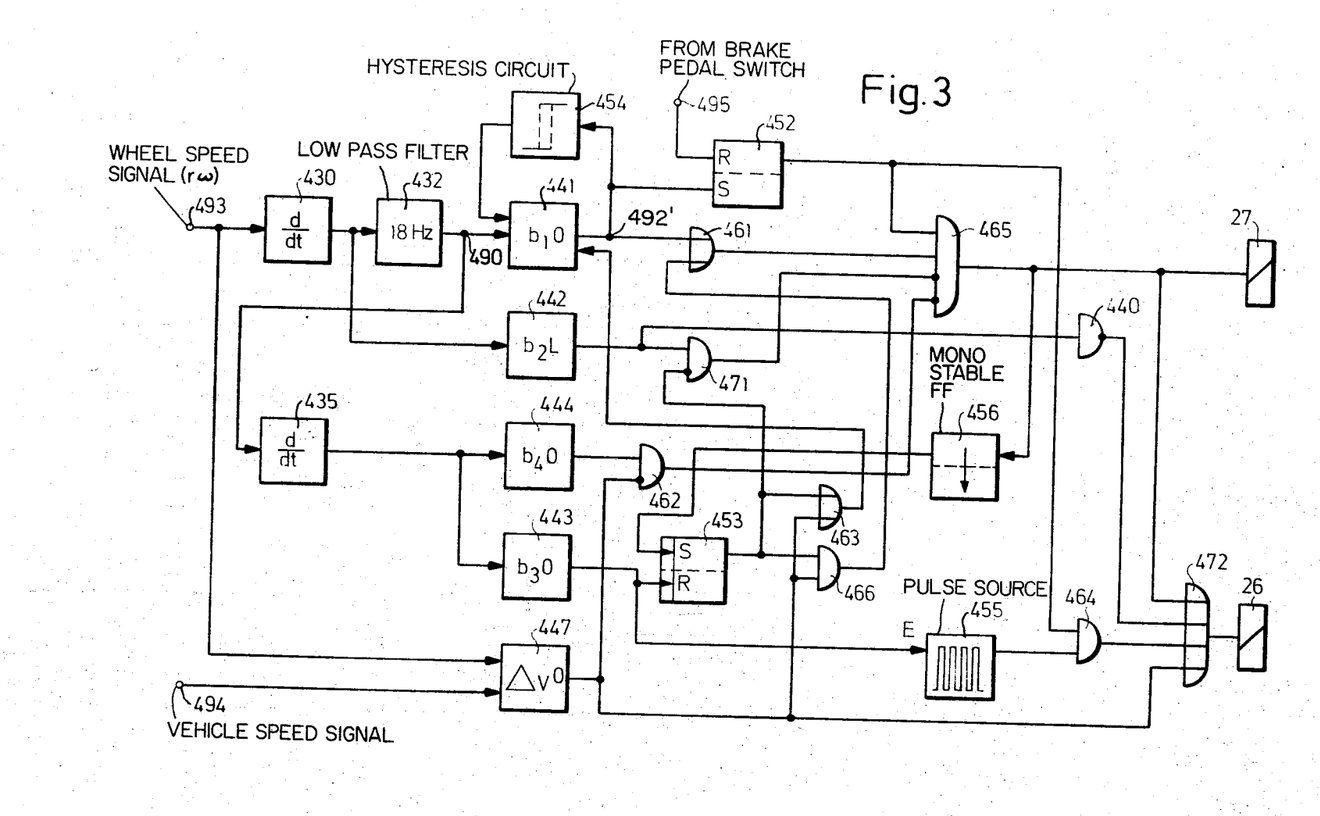
FIG. 3 is a block circuit diagram of a modification of the system.

The system of FIG. 3 is somewhat simpler than that of FIG. 2 and does not use the fifth threshold switch which, rather, is replaced by an inverter stage. Further, the first threshold switch is constructed to have a certain hysteresis to function, simultaneously, as the first storage device. In general, similar parts have been given similar reference numerals, incremented by 100, and unless described specifically their function is similar to that of the example of FIG. 2.

The first differentiator 430 is connected to input terminal 493, which has a d-c signal applied thereto of a magnitude representative of wheel circumferential speed. A low pass filter 432 of maximum frequency of 18 Hz has the output from differentiator 430 applied. The second threshold switch 442 is connected directly to the output of differentiator 430. The second differentiator 435 is also connected to the output of the low pass filter 432. The first threshold switch 441, connected to the output of the low pass filter 432 includes a hysteresis circuit 454, connected between the output and an additional input of threshold switch 441.

The output of the second differentiator 435 is connected to the third and fourth threshold switches 443, 444. A speed comparator circuit 447 is provided, having input terminals 493, 494.

The output of the first threshold switch 441 is connected to
1. the set input S of the second store 452 and
2. one input of an OR-gate 461.

The reset input of the second store 452 is connected to terminal 495 which is opened, or de-energized when the brake pedal 20a (FIG. 7) is operated. Winding 27 of the drain control valve 22 is controlled by an AND-gate 465, which has four inputs. Two of these inputs are connected with the outputs of the second store 452 and the OR-gate 461, respectively.

The output of the OR-gate 465 further is connected over delay stage 456 to the set input S of the third store 453. The output of the third threshold switch 443 is connected to the reset input R of the third store 453 and to the blocking input E of the monostable multivibrator 455. OR-gate 463 and AND-gate 466 are connected similarly to the embodiment described in connection with FIG. 2, that is, the two inputs thereof are connected, respectively, to the third store 453 and to the speed comparator 447. The output of AND-gate 466 is connected to the second input of OR-gate 461. The output of OR-gate 463 is connected to the threshold changing input of the first threshold switch 441.

AND-gate 462 has its input connected to the speed comparator 447 and to the fourth threshold switch 444. An additional AND-gate 471 is connected with its inputs to the outputs of the second threshold switch 442 and of the third store 453. The outputs of AND-gates 462, 471 are connected to two further inputs of AND-gate 465.

An OR-gate 472 is connected in advance of the magnet winding 26, for isolation and control by a plurality of input lines. Two of the inputs are connected to the outputs of AND-gate 465 and to the speed comparator 472, respectively. A third input is connected over an inverter 440 (shown as a single input AND-gate with inverted output), and controlled by the output of the second threshold switch 442. A fourth input of OR-gate 472 is connected with the output of an AND-gate 464, which has two inputs; one of them is the output of the astable MV 455 and the other is the second store 452.

Since the fifth threshold switch having a level $b_0$ is missing, the effect of the circuit of FIG. 3 is similar to that of FIG. 2, with the threshold levels $b_2$ and $b_0$ having both the same value of $-2g$. The hysteresis circuit 454 connected to the first threshold switch 441 provides a hysteresis effect similar to a $+4g$ switching hysteresis. The output of the first threshold switch 441, when at rest position, has a 0-signal, which jumps to a 1-signal when the wheel acceleration drops below the value of $-3.5g$ deceleration. The threshold switch 441 will reset to zero, however, only when the wheel will accelerate and will have an acceleration of $+0.5g$ due to the $+4g$ switching hysteresis.

If the first threshold switch 441 has a 1-signal at its threshold change input, then the threshold switching levels are changed, such that the lower level goes from $-3.5g$ to $-2.5g$, and the upper level (due to hysteresis) changes from $+0.5g$ to $+1.5g$. The two switching levels $b_3$, $b_4$ are set, similar to the first example to 400 $g$/sec. and 200$g$/sec., respectively.

Figure 5:
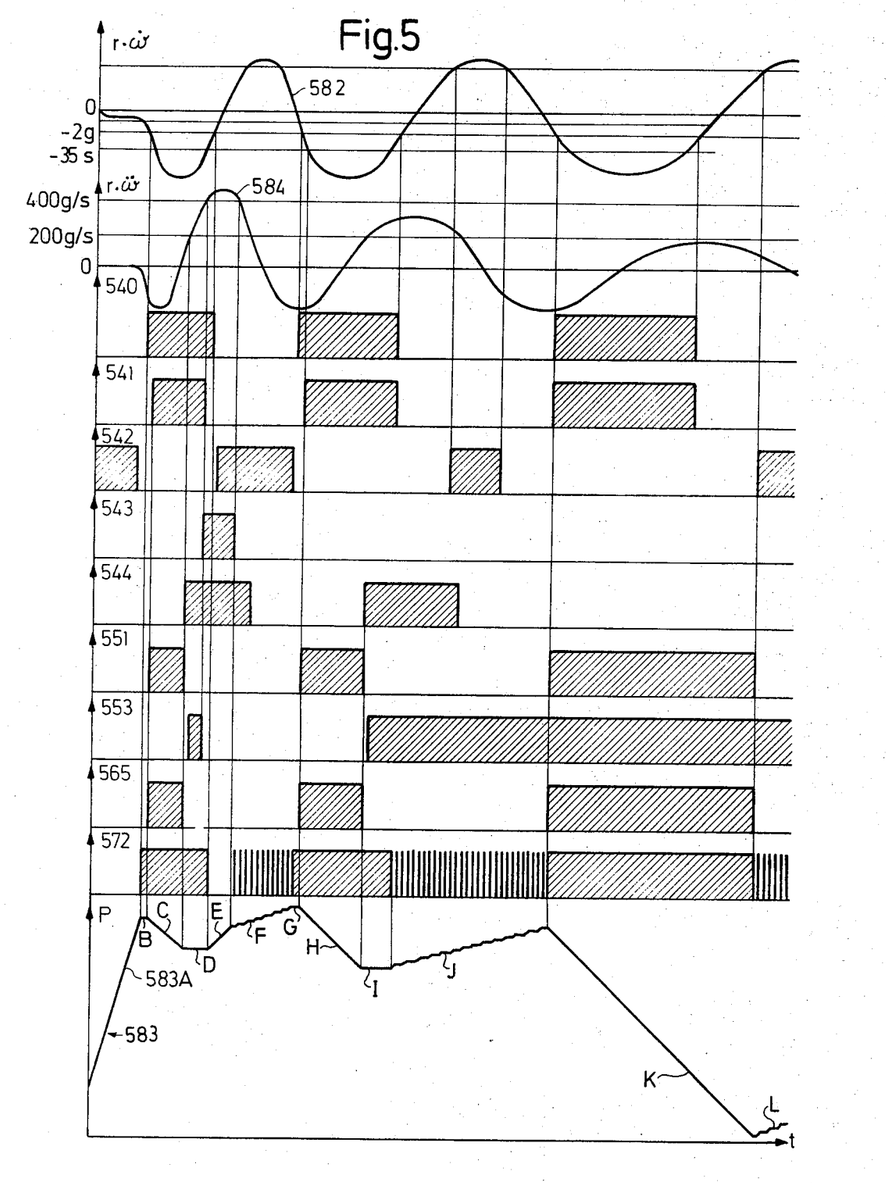
FIG. 5 is a timing diagram illustrating operation of the system of FIG. 2.
Figure 6:
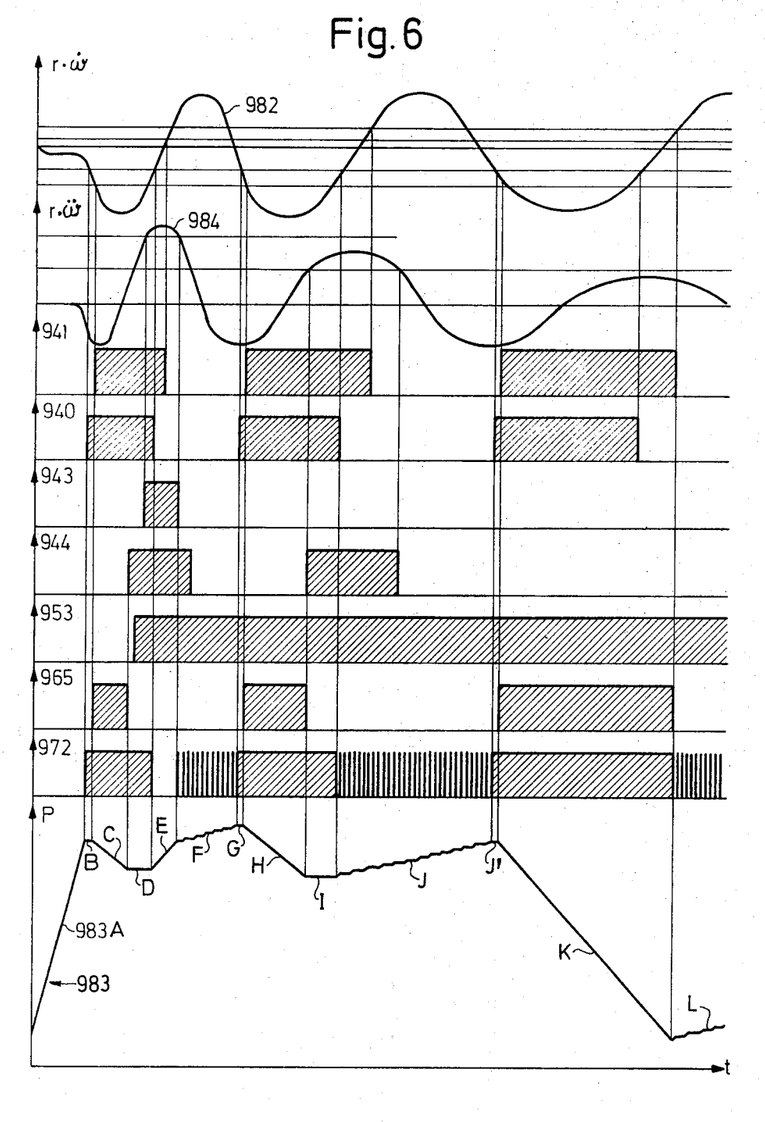
FIG. 6 is a timing diagram illustrating the operation of the system of FIG. 3.

The diagram of FIG. 6 is similar to that of FIG. 5. Curves 982, 984 correspond to curves 582, 584 of FIG. 5 and the pulse diagrams of FIG. 6 represent, in sequence, the output voltages of the following stages: first threshold switch 441, inverter 440, third threshold switch 443, fourth threshold switch 444, third store 453, AND-gate 465 and OR-gate 472. Curve 983 illustrates braking pressure $p$ similar to the curve 583, FIG. 5.

Operation: The rapid pressure rise, curve section 983 A at the start of braking is terminated when the inlet valve 21 closes, that is, when threshold level $b_2$ is passed, so that the second threshold switch 442 provides a 0-signal at its output. This 0-signal is inverted into a 1-signal by the inverter stage 440, so that magnet winding 26 is controlled to be energized over OR-gate 472. Shortly thereafter, the first threshold switch 441 will respond and the 1-signal at its output will control magnet winding 27 directly over OR-gate 461 and AND-gate 465. To open AND-gate 465, the second store 452 must provide a 1-signal and AND-gates 471, 462 must provide a 0-signal. This is the case, since the second store 452 has been set (due to response of switch 441) and remains set (brake pedal depressed and terminal 495 energized) and third store 453 has not yet been set, thus providing a 0-signal. The fourth threshold switch 444 also provides a 0-signal, so that AND-gate 462 will have a 0-signal thereon. Similarly, AND-gate 471 will provide a 0-signal since the second threshold switch 442 still provides a 0-signal.

After the brief period of constant pressure — curve section B — and the subsequent drop in braking pressure due to energization of drain valve winding 27 — curve 983, section C — the wheel will accelerate and when the wheel acceleration reaches 200 $g$/sec. in positive direction, the fourth threshold switch 444 will respond. Assuming that the speed comparator 447 has not yet responded, that is, provides a 0-signal, the 1-signal at the output of the fourth threshold switch 444 will provide a 1-signal at the output of AND-gate 462. This blocks AND-gate 465 and drain valve 27 will close again, and braking pressure will remain constant at a lower value — curve section D.

The delay circuit 456, preferably a monostable flip-flop, is so constructed that change-over from one to zero at the output of AND-gate 465 will trigger the delay circuit 456 and provide a 1-signal at its output, about 2 msec. later, in order to set the third store 453. Third store 453 has dynamic inputs, that is, it is triggered only upon changes in signal, that is signal pulses. A dynamic input can readily be constructed by connecting a series circuit formed of a differentiating capacitor and a diode to the input.

The constant brake pressure, curve section D, will continue until the wheel deceleration decreases again and the threshold value $b_2$ of $-2g$ is passed. The second threshold switch 442 then will provide a 1-signal and inverter stage 440 will provide a 0-signal, so none of the inputs of OR-gate 472 will have a 1-signal. Some time in advance, the third threshold switch 443 has responded (during the first control cycle — curve sections A–D). The 1-signal at the output of the third threshold switch 443 blocks the astable MV 455 over the blocking input E. This permits rapid, steep pressure rise, in the same manner as described in connection with FIG. 2 — see curve 983, section E.

The rapid pressure rise continues until the threshold level $b_3$ of the third threshold switch 943 is passed. Since the astable MV 455 is then no longer blocked, the inlet valve 26 is de-energized in pulses (permitting pulsed opening and closing) and providing for a slow, gradual pressure rise — curve section F. This slow pressure rise is terminated at the start of the second control cycle, that is, when the second threshold switch 442 responds again, in order to provide continued energization to the magnet winding 26 of the pressure valve 21, and thus interruption of supply of pressurized brake fluid.

The second control cycle starts with a very brief constant pressure phase — curve section G. This may be very short, that is, until the wheel deceleration of $-2.5g$ triggers the first threshold switch 441. The threshold level of the first threshold switch 441 has been shifted since, shortly after the reset of the AND-gate 465, the third store 453 has been set. The first threshold switch 441 then opens the drain valve by energizing winding 27, and brake pressure $p$ drops rapidly — see curve section H. The other logic conditions to enable AND-gate 465 to drop the pressure are similar to those described in connection with curve section C. Pressure drop will continue until the fourth threshold switch 444 will respond, causing the brake fluid pressure to remain even, curve section I.

Brake pressure $p$ is thus held constant during the time of curve section I until the retardation drops below $-2g$. In accordance with the assumption, the road became more slippery during the second control cycle. The third threshold switch 443 thus will not respond and, rather than a rapid pressure rise, pressure will rise only in accordance with the pulsed output from circuit 455. The pulsed pressure rise corresponding to pumping of the brake pressure permits acceleration of the vehicle wheel unitl, due to the linear rise in braking effort or torque, acceleration will change to deceleration. This phase is seen in curve section J of the pressure curve. Towards the end of the section J, when the wheel again decelerates, the threshold level $b_2$ of threshold switch 442 will be passed, and the pressure inlet valve will close again to initiate a third control cycle. This third control cycle starts with a brief constant pressure period, curve J'.

Following the brief constant pressure phase, as shown by curve section J', the pressure will drop steeply, curve section K. This phase of the cycle is initiated by response of the first threshold switch 441, as in the first two control cycles. The pressure drop phase is not terminated by the fourth threshold switch 444, nor by the second threshold switch 442 however, since: (a) the fourth threshold switch 444 does not respond anymore due to the very slippery road surface condition and (b) the AND-gate 471 does not provide signals anymore. Failure of the AND-gate 471 to provide a signal is caused by the 1-signal from the third store 453 which has already provided a 1-signal since the first control cycle. The pressure drop phase of the cycle thus continues until wheel acceleration has increased to trigger threshold level $b_1$, at the changed, reset level of +1.5g, of the first threshold switch 441. This changes the first threshold switch 441 to provide a 0-signal and the second winding 27 is de-energized. None of the inputs of the OR-gate 472 will have a 1-signal applied thereto however, so that the pressure rise which follows will be solely under control of the pulse source 455, as seen in curve section L.

The three control cycles above described show that the duration of the pressure drop phase of the control cycles can be influenced by three stages of the network:

1. if the road is dry, under ordinary conditions, by the fourth threshold switch 444 over AND-gate 462.
2. Upon slippery road conditions, if the third store 453 has not yet been set, second threshold switch 442 and AND-gate 471 will be controlling; and
3. if the road surface is very slippery, so that the third store 453 has been set, first threshold switch 441, with changed threshold level, will control.

As in the first example, additionally, the speed comparator circuit 447 may override over OR-gate 466, if the speed comparator circuit should respond.

The circuit of the second example of FIG. 3 permits setting the speed comparator 447 to comparatively small differences in speed, so that at low vehicle speeds, windings 26 and 27 are, for all practical purposes, controlled only by the speed comparison circuit 447.

Figure 4:
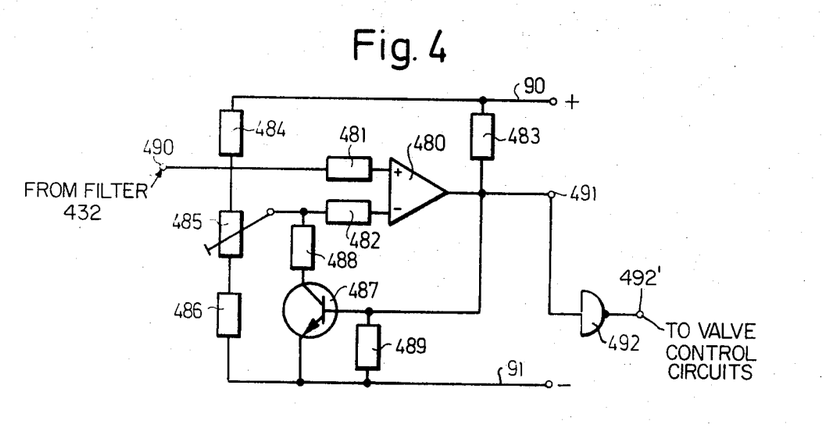
FIG. 4 is a schematic block diagram of a component circuit of the system.

FIG. 4 illustrates schematically the circuit diagram of the first threshold switch and the hysteresis element, 441, 445, respectively (FIG. 3). The threshold circuit 441 includes an operational amplifier 480, which has its non-inverting input connected over resistor 481 to an input terminal 490 which forms the output terminal of low pass filter 432, 332, respectively. The inverted input of the operational amplifier 480 is connected to a voltage divider formed of resistors 484, potentiometer resistor 485 and resistor 486, all connected in series. The tap point of the potentiometer 485 is connected over input resistor 482 to the inverting input of the operational amplifier 480. The output of operational amplifier 480 is connected with resistor 483 and then to positive bus 90. The output terminal of the operational amplifier is shown at 491. A switching transistor 487 has its emitter connected to negative bus 91, its collector over resistor 488 to the tap point of the voltage divider and its base to the output 491 of the operational amplifier 480. An emitter-base bias resistor 489 is further provided.

The voltage divider 484, 485, 486 is so dimensioned that, when the circuit is in rest condition, that is, at acceleration zero, the voltage at input terminal 490 is higher than the tap voltage applied to the inverting input. The tap voltage is partly short-circuited since transistor 487 will be conductive. As a result, output terminal 491 of operational amplifier 480 effectively has positive voltage, that is the voltage of bus 90 appearing thereat. This also holds switching transistor 487 conductive to provide for partial short circuiting of the voltage divider resistor 486. If the output of differentiator 430 becomes more and more negative, a point will be reached at which the tap point of the voltage divider is passed, and the output voltage of operational amplifier 480 will suddenly change to negative potential, that is, of bus 91. This blocks switching transistor 487 and the voltage applied to the inverting input of operational amplifier 480 will change substantially, since the voltage at the tap point of potentiometer 485 will rise. The operational amplifier 480, however, does not switch back immediately when the voltage at input terminal 490 rises again to switching level, but rather at a substantially higher value, determined by the amount of parallel resistance introduced (or removed from) the input to the operational amplifier as determined by the value of resistor 488 and the emitter-collector resistance of transistor 487. This provides for the switching hysteresis which, in the example, is +4g.

The circuit of the threshold switch of FIG. 4 does not provide the required output since, at acceleration zero, it should provide a 0-signal and not a 1-signal. An inverter 492 having output terminal 492' is thus connected to the output terminal 491 of operational amplifier 480.

The anti-skid or anti-lock device is sensitive to changing road conditions, and particularly to very slippery road conditions. The third and fourth threshold switches which are controlled by the second differentiator permit distinguishing between three road conditions, dry, slippery and very slick. More road conditions can be distinguished if more switches similar to the threshold switches 343, 344 are used, thus providing finer control at the cost of additional equipment and complexity with the interlock logic circuit to control the brake fluid valves. The threshold levels for change in acceleration can be readily matched to various types of vehicles having different road holding characteristics and weights. The second example (FIG. 3) is somewhat simpler in that one low pass filter, a storage device and a threshold switch are omitted, without very much interfering with the effectiveness of the system. Various road conditions have different threshold switches associated therewith in order to terminate the pressure drop phase of the control cycle. This additionally enhances the reliability of the circuit. Should one of the threshold switches become defective or fail to operate, then the next one will ensure that the pressure dropping phase of the control cycle is terminated.

Various changes and modifications may be made within the inventive concept and features described in connection with any one embodiment may similarly be applied to other embodiments within the scope of the invention.

We claim:

1. Vehicle wheel brake anti-lock system for fluid operated brakes having means (20, 25b, 25a, 20a) supplying a brake fluid medium under pressure;

controllable brake pressure valve means (21) having a pressure control winding (26) and applying pressurized brake fluid to a wheel brake cylinder (23);

controllable bleeder valve means (22) having a bleeder control winding (27) bleeding brake fluid from the wheel brake cylinder;

means (393, 493) providing a signal ($r\omega$) representative of wheel speed;

two differentiators (330, 335; 430, 435) connected in series, having the wheel speed signal ($r\omega$) applied thereto and providing, respectively, a wheel acceleration/deceleration signal ($r\dot\omega$) forming the differentiated wheel speed signal and a rate of change of acceleration/deceleration signal ($r\ddot\omega$)

forming the second derivative of the vehicle speed signal;

a group of at least four threshold switches (341–344) connected to the differentiators;

the first threshold switch (341, 441) being connected to the first differentiator (330, 430) and responding to wheel deceleration exceeding a first threshold level ($b_1$) corresponding to maximum wheel deceleration and being connected to open said bleeder valve means (22, 27) and to close the pressure valve means (21, 26) to effect a steep drop in brake fluid pressure applied to the wheel, the second threshold switch (342, 442) being connected to the first differentiator (330, 430) and responding to wheel acceleration exceeding a second level ($b_2'$), and being connected to close said bleeder valve means (22, 27) to effect termination of the steep drop in brake fluid pressure, the third threshold switch (343, 443) being connected to the second differentiator (335, 435) and responding to a high rate of positive change of the acceleration signal ($r\ddot{\omega}$), indicative of high road grip of the wheel and being connected to open said pressure valve means (21, 26) to effect a steep rise in brake fluid pressure applied to the wheel;

and the fourth threshold switch (344, 444) being connected to the second differentiator (335, 435) and responding to a low rate of positive changes of the acceleration signal ($r\ddot{\omega}$), indicative of poor road grip of the wheel, and being connected to close said drain valve means (22, 27) to effect termination of the steep pressure drop in brake fluid pressure in advance of response of the second threshold switch upon presence of road grip causing a rate of wheel acceleration less than the response level of the third threshold switch (343, 443) but in excess of its rate of acceleration threshold level.

2. System according to claim 1, wherein the third and fourth threshold switches are set for about 400 g/sec. and 200 g/sec., respectively.

3. System according to claim 1, wherein the first and second threshold switches are set for about −3.5g and +4g.

4. System according to claim 1, further comprising two low pass filters (332, 333, 432) connected to the output of the first differentiator (330, 430) and providing the differentiated wheel speed signal to the first and second threshold switches;

the first threshold switch (341) and the second differentiator (335) being connected to the first low pass filter (332, 432), and the second threshold switch (342) being connected to the second filter (333).

5. System according to claim 4, wherein the first low pass filter (332) has an upper limit frequency of about 18 Hz, and the second low pass filter (333) has an upper limit frequency of about 40 Hz.

6. System according to claim 1, further comprising a fifth threshold switch (340) responding to wheel deceleration between zero and the threshold level of said first threshold switch (341, 441), said fifth threshold switch being connected to the output of the first differentiator (330).

7. System according to claim 1, further comprising signal storage means (351) connected to the output of said first threshold switch (341).

8. System according to claim 7, further comprising switching means (352) providing a signal indicative of operation, or non-operation of the fluid operated brakes;

and an AND-gate (365) controlled by the outputs of said signal storage means and said switching means.

9. System according to claim 8, wherein the switching means has a set (S) and a reset (R) input, the set input (S) of the switching means (352) being connected to the output of the signal storage means, and the reset input (R) of the switching means being connected to a switch connected to the fluid operated brakes.

10. System according to claim 1, further comprising an AND-gate (361) having the outputs of the first and second threshold switches (341, 342) applied thereto;

a signal storage means (351), the output of the AND-gate (361) being connected to the set input (S) of the signal storage means.

11. System according to claim 1, further comprising a speed comparator circuit (347) having at one input (394) a signal representative of vehicle speed applied thereto and having, at a second input (393) the signal representative of wheel speed applied thereto, the output from said speed comparator circuit controlling said pressure valve means (21, 26) and hence flow of pressurized brake fluid to the wheel cylinder (23) in a direction to inhibit application of pressurized brake fluid to the wheel cylinder when the comparator circuit indicates excessive speed difference between circumferential wheel speed and vehicle speed.

12. System according to claim 11, further comprising an AND-gate (362) having the output of said speed comparator circuit (347) and the output of one of said additional threshold switches applied thereto;

and means (371) connecting the output of the second threshold switch and of said AND-gate (362) to the reset input (R) of the signal storage means.

13. System according to claim 12, further comprising additional signal storage means (353) having set and reset inputs;

a timing circuit (356), said timing circuit being connected to the output of the signal storage means (351) and having its output connected to said additional signal storage means (353);

and means connecting one of said additional threshold switches (343, 344) to the reset input (R) of the additional signal storage means.

14. System according to claim 1, where in the at least the first of the first and second threshold switches (341, 342) has variable threshold levels ($b_1, b'_1; b_2, b'_2$), said threshold switch, or switches including a threshold change input changing the threshold levels of the respective switch, or switches in a positive rate of change of vehicle speed direction;

and means (OR 363) including time delay means (356) controlling the threshold change inputs from the output of said first threshold switch (341).

15. System according to claim 14, wherein the means controlling the threshold level inputs comprises an OR-gate (363), a storage device (353) and a time delay circuit (356), the time delay circuit being connected to the output of the first threshold switch (341) and, with time delay, storing a signal in said storage means (353);

a speed comparator circuit is provided having as one input (394) a signal representative of vehicle speed applied thereto and having, at a second input (393), the signal representative of wheel speed applied thereto, the output from said comparator circuit further controlling said threshold change input.

16. System according to claim 15, further comprising an AND-gate (366) having as inputs the output from said speed comparator circuit and from said additional storage means (353), the output of the AND-gate (366) controlling the drain valve control means.

17. System according to claim 16, further comprising a signal storage means (351) connected to the output of said first threshold switch (341) and to the output of said AND-gate (366).

18. System according to claim 1, further comprising a pulse source (355) having a blocking input (E);

and means connected to the third switch (343, 443) and to the blocking input (E) to inhibit the output pulses from being delivered by said pulse source when the third threshold switch (343, 443) provides a signal to the blocking input, the output of the pulse source being connected to the pressure valve control winding (26).

19. System according to claim 18, further comprising an AND-gate (364) having its input connected to be controlled by said first threshold switch (341, 441) and, when energized, transferring pulses from said pulse source.

20. System according to claim 19, wherein a multiple control input (372) is provided to the winding of the pressure valve winding (26) to energize the valve if:

a. said first threshold switch (341) has responded; or b. an other threshold switch (340) has responded; or c. said pulse source (355) is energized and said first threshold switch (341) has responded; or d. a speed comparator circuit (347) has responded.

21. System according to claim 1, wherein the first threshold switch (FIG. 3: 441) has a switching hysteresis so that the switch will change state by responding to wheel deceleration exceeding a first threshold level ($b_1$) and change state back again upon wheel rate of change of speed of a different magnitude than said first change of state.

22. System according to claim 21, further comprising a hysteresis circuit (454) connected between the output of the first threshold switch and the input thereof.

23. System according to claim 22, wherein the first threshold switch (441) comprises (FIG. 4) an operational amplifier (480);

voltage divider means (484, 485, 486) connected to an input of the operational amplifier and setting the first threshold level ($b_1$) of the threshold switch;

a switching transistor (487) having its emitter-collector path connected in parallel to a portion of the voltage divider circuit, and its base connected to the output of the operational amplifier (480).

24. System according to claim 21, further comprising a low pass filter (432) having the wheel acceleration/deceleration signal ($r\dot{\omega}$) applied thereto and having its output connected to the first threshold switch (441);

the second threshold switch (442) having the output of the wheel acceleration/deceleration signal ($r\dot{\omega}$) applied directly thereto, whereby a time delay will result between application of the rate of change of wheel speed signals to the first and second threshold switches;

and wherein the second differentiator (435) is connected to the output of the low pass filter (432).

25. System according to claim 21, wherein;

a speed comparison circuit (447) is provided having an output signal representative of difference in circumferential wheel speed and vehicle speed;

and an AND-gate (462) is provided, having the outputs of the fourth threshold switch (444) and the inverse of the speed comparison circuit (447) applied thereto, to provide an output if the speed comparison circuit does not respond but the fourth threshold switch (444) has responded.

26. System according to claim 25, further comprising additional signal storage means (453) having set and reset inputs, the reset inputs being connected to the output of the third threshold switch (443);

an OR-gate (463) and an AND-gate (466), the outputs of the speed comparison circuit (447) and of said additional signal storage means (453) being connected, in parallel, to said OR-gate (463) and to said AND-gate (466).

27. System according to claim 26, wherein at least one of said threshold switches (441) has a threshold change input terminal;

and the output of the OR-gate (463) is connected to the threshold change input to change the threshold setting of the threshold switch to respond at a lesser value of wheel deceleration, and to shift the hysteresis response in the direction of positive rate of change of vehicle speed.

28. System according to claim 26, further comprising an AND-gate (471) having one input controlled by the output of said additional signal storage means (453) and by the output of said second threshold switch (442);

the output of said AND-gate (441) controlling operation of said drain control valve.

29. System according to claim 1, wherein the brake control system includes a brake controller (20a) and switching means coupled to the brake controller and providing a signal when the brake controller is not operated;

and switching means (452) coupled to the output of the first threshold switch (341, 441) and being connected to the brake controller switch to be disabled when the brake controller switch is not operated.

30. System according to claim 29, wherein the drain valve control means is controlled by an AND-gate (465), said AND-gate being enabled by said switching means (452) and by operation of said first threshold switch (441), and upon non-operation of said second threshold switch (442) and one of said additional threshold switches (443, 444).

31. System according to claim 30, further comprising a time delay means (456) connected to the output of the AND-gate (465) and having a delayed output thereof; and a further additional signal storage means (453) connected to the output of the time delay means (456) and providing a delayed output to the input of said AND-gate disjunctively with said first threshold switch (441).

32. System according to claim 30, further comprising a pulse source (455) having a blocking input, the blocking input being connected to one (443) of the third and fourth threshold switches (443, 444) and having its output connected to the pressure control valve (21, 26) to repetitively disable the pressure control, in pulsed sequence, and provide pulsed, interrupted flow of brake fluid under pressure to the wheel brake cylinder.

33. System according to claim 32, further comprising connection means (472) connected to the pressure valve winding (26) to close the pressure valve 21 upon a. energization of the drain control valve (22, 27), or b. activation of a speed comparison circuit (447) having an output signal representative of difference in circumferential wheel speed and vehicle speed, or c. no output from the second threshold switch (442–440), or d. pulses are derived from said pulse source (455).

34. System according to claim 1, wherein at least one of said first and second threshold switches (341, 342, 441) has a variable threshold level, and includes a threshold change input;

and means controlling the threshold change level input from at least one of said third and fourth threshold switches (343, 344).

35. System according to claim 34, wherein the direction of change of threshold level, upon control by said at least one of the third and fourth switches, is to render the system more sensitive to provide for automatic adaptation of the system to changes in road conditions as sensed by rate of change of acceleration, or deceleration ($r\ddot{o}$).

36. System according to claim 1, further comprising a low pass filter means (332, 432) connected between the output of the first differentiator (330, 430) and the input of the second differentiator (335, 435).

37. System according to claim 36, wherein the low pass filter means has an upper limit frequency of about 18 Hz.

38. System according to claim 37, further comprising connection means connected between the output of the first differentiator (330, 430) and the input of the second threshold switch (342), said connection means having a signal transfer characteristic which introduces a time delay of response of the second threshold switch which is small with respect to the time delay caused by said filter means (332, 432).

39. System according to claim 38, wherein said connection means comprises a filter (333).

40. System according to claim 1, further comprising low pass filter means (332, 432) connected between the output of the first differentiator (330, 430) and the input of the first threshold switch (341, 441).

* * * * *